United States Patent
Nishi et al.

(10) Patent No.: US 10,025,789 B2
(45) Date of Patent: Jul. 17, 2018

(54) DATA ANALYZING APPARATUS AND PROGRAM

(71) Applicants: KABUSHIKI KAISHA TOSHIBA, Minato-ku (JP); TOSHIBA SOLUTIONS CORPORATION, Kawasaki-shi (JP)

(72) Inventors: Kazuyoshi Nishi, Fuchu (JP); Shigeru Matsumoto, Nishitokyo (JP); Shozo Isobe, Kawasaki (JP); Hideki Iwasaki, Fuchu (JP); Shigeaki Sakurai, Tokyo (JP); Kyoko Makino, Kawasaki (JP); Rumi Hayakawa, Yokohama (JP); Seiji Egawa, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 543 days.

(21) Appl. No.: 14/671,040

(22) Filed: Mar. 27, 2015

(65) Prior Publication Data
US 2015/0199364 A1 Jul. 16, 2015

Related U.S. Application Data

(63) Continuation of application No. PCT/JP2013/073843, filed on Sep. 4, 2013.

(30) Foreign Application Priority Data

Sep. 27, 2012 (JP) ................................. 2012-214885

(51) Int. Cl.
*G06F 17/30* (2006.01)
*G06Q 10/00* (2012.01)
(Continued)

(52) U.S. Cl.
CPC ......... *G06F 17/30076* (2013.01); *G06N 5/02* (2013.01); *G06N 99/005* (2013.01); *G06Q 10/00* (2013.01)

(58) Field of Classification Search
CPC ............... G06F 17/18; G06F 17/30528; G06F 2217/10; G06F 17/30477; G06F 17/30554;
(Continued)

(56) References Cited

U.S. PATENT DOCUMENTS 7,543,056 B2 * 6/2009 McClure ................ G02B 6/105
709/200
8,280,829 B2 * 10/2012 Chapelle .............. G06N 99/005
706/12
(Continued)

FOREIGN PATENT DOCUMENTS

CN 1402153 A 3/2003
CN 101221636 A 7/2008
(Continued)

OTHER PUBLICATIONS

Extended European Search Report dated Feb. 5, 2016 in European Patent Application No. 13841837.1.
(Continued)

*Primary Examiner* — Angelica Ruiz
(74) *Attorney, Agent, or Firm* — Oblon, McClelland, Maier & Neustadt, L.L.P.

(57) ABSTRACT

A data analyzing apparatus of an embodiment generates a format variation, analytical algorithm name, and analytical parameter not stored in a first storage device, and executes analysis. The data analyzing apparatus determines whether the application accuracy is lower than the knowledge model accuracy. If the determination result is "not lower", the data analyzing apparatus reactivates a format variation generat-
(Continued)

ing device and an analytical parameter generating device. If the determination result is "lower", the data analyzing apparatus reads out a format variation and knowledge model name associated with the highest priority order in the first storage device, and executes analysis.

5 Claims, 7 Drawing Sheets

(51) Int. Cl.
*G06N 5/02* (2006.01)
*G06N 99/00* (2010.01)
(58) Field of Classification Search
CPC ............ G06F 17/30867; G06F 19/704; G06F 17/30551; G06F 19/24
See application file for complete search history.

(56) References Cited

U.S. PATENT DOCUMENTS

| 2003/0041062 | A1 | 2/2003 | Isoo et al. |
| 2007/0196804 | A1 | 8/2007 | Yoshimura et al. |
| 2007/0299798 | A1 | 12/2007 | Suyama et al. |
| 2008/0162081 | A1 | 7/2008 | Sato |
| 2008/0255760 | A1* | 10/2008 | Rojicek ................. G06Q 10/04 702/3 |
| 2009/0313230 | A1 | 12/2009 | Shimizu |
| 2011/0016065 | A1* | 1/2011 | Chapelle ............. G06N 99/005 706/12 |
| 2013/0273968 | A1* | 10/2013 | Rhoads ............ G06F 17/30244 455/556.1 |

FOREIGN PATENT DOCUMENTS

| JP | 2007-219955 A | 8/2007 |
| JP | 2008-3920 A | 1/2009 |
| JP | 2009-087190 A | 4/2009 |
| JP | 2009-237832 A | 10/2009 |
| JP | 2010-152751 A | 7/2010 |
| JP | 2012-014659 A | 1/2012 |

OTHER PUBLICATIONS

Combined Office Action and Search Report dated Aug. 24, 2016 in Chinese Patent Application No. 201380050317.X with English translation.
International Search Report dated Oct. 15, 2013 for PCT/JP2013/073843 filed on Sep. 4, 2013 with English Translation.
Written Opinion dated Oct. 15, 2013 for PCT/JP2013/073843 filed on Sep. 4, 2013.

\* cited by examiner

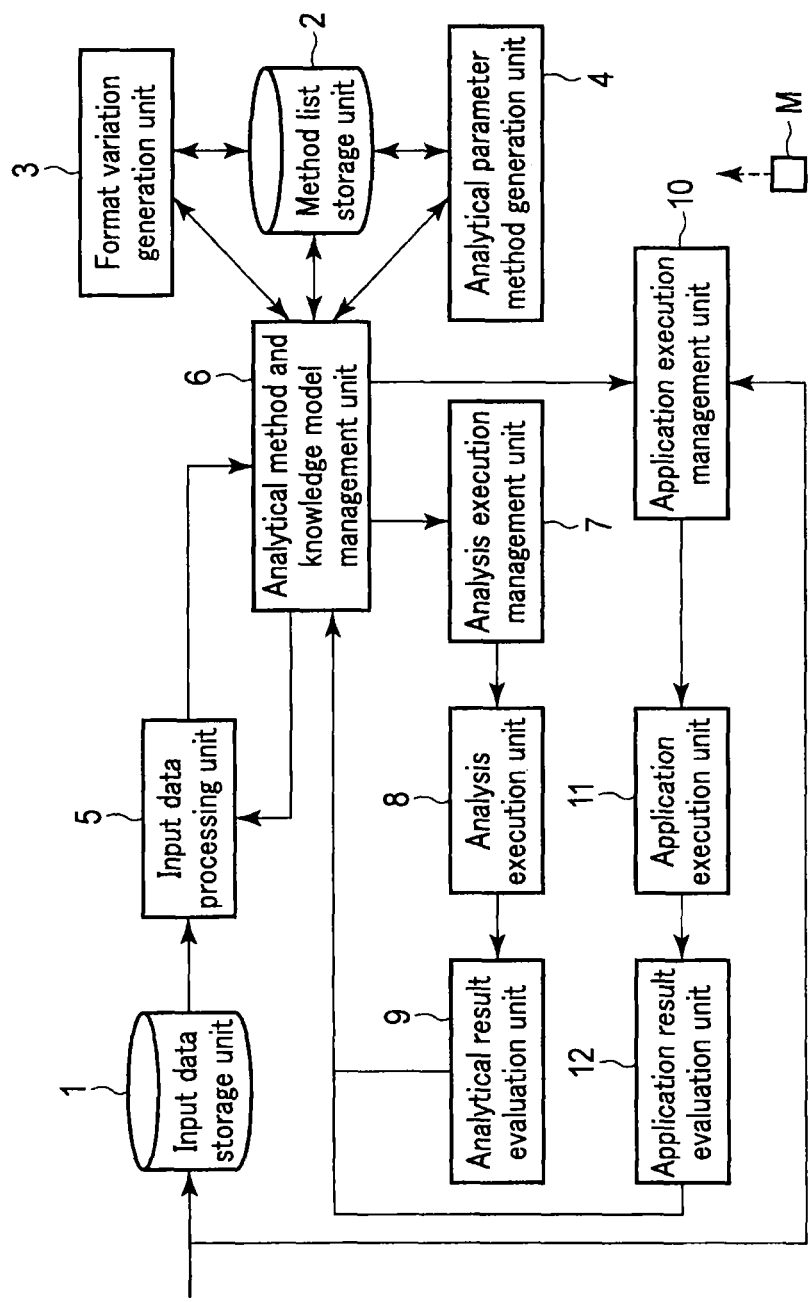
F I G. 1

T1 Analytical method list table

| Priority order | Analytical method ID | Format variation of input data | Input data period | Analytical algorithm name | Analytical parameter |
|---|---|---|---|---|---|
| 1 | M001 | Original data, weekly average,.... (e.g., power consumption, traffic congestion weekly average) | 2010_01_01— 2011_06_08 | Association analysis | Depth=7, Threshold=6 |
| 2 | M003 | Original data, monthly average,.... (e.g., power consumption, traffic congestion monthly average) | 2010_01_01— 2011_03_01 | Association analysis | Depth=4, Threshold=3 |
| 3 | | | | | |
| 4 | | | | | |
| ... | | | | | |

| Knowledge model name | Knowledge model accuracy | Knowledge model accuracy acquisition date/time | Application accuracy | Application accuracy acquisition date/time |
|---|---|---|---|---|
| A_20110608 | 0.93 | 2010_06_08_00:00 | 0.93 | 2010_07_08_00:00 |
| B_20110301 | 0.88 | 2011_03_01_00:00 | 0.88 | 2011_04_01_00:00 |
| | | | | |
| | | | | |

F I G. 2

L1 Format variation candidate setting list

| Time | Place |
|---|---|
| Three-day average | National average |
| Weekly average | Prefectural average |
| Monthly average | Municipal average |
| Annual average | |

FIG. 3

L2 Analytical parameter method setting list

| Analytical algorithm name | Item | Value |
|---|---|---|
| Association analysis | Depth | 1~10 |
| | Threshold | 1~30 |

FIG. 4

T2 User setting threshold table

| Knowledge model accuracy lower limit | Application accuracy lower limit |
|---|---|
| 0.8 | 0.6 |

FIG. 7

T3 Parallel execution related information table

| Machine name | Use status | Use method type | Analytical method ID | Knowledge model name |
|---|---|---|---|---|
| Machine 1 | In use | Knowledge model generation using existing method | M008 | B_20110301 |
| Machine 2 | In use | Knowledge model generation using new method | | |
| ⋮ | | | | |

FIG. 8

DATA ANALYZING APPARATUS AND PROGRAM

CROSS-REFERENCE TO RELATED APPLICATIONS

This application is a Continuation Application of PCT application No. PCT/JP2013/073843, filed on Sep. 4, 2013, and is based upon and claims the benefit of priority from Japanese Patent Application No. 2012-214885, filed on Sep. 27, 2012; the entire contents of which are incorporated herein by reference.

FIELD

Embodiments described herein relate generally to a data analyzing apparatus and program.

BACKGROUND

Conventionally, a data analyzing apparatus poses three problems [1] to [3] when analyzing big data. First problem [1] is the incapability of using an optimum combination of, an analytical parameter and input data format. Second problem [2] is that the accuracy decreases in accordance with a change in input data trend. Third problem [3] is the incapability of solving first and second problems [1] and [2] at the same time. Problems [1] to [3] will be described in detail below.

[1] It is beginning to find that when performing data analysis (e.g., machine learning), analysis using processed data (e.g., a weekly average) based on original data has a larger influence on the accuracy of analytical results than analysis using only original data as input data to be used.

Unfortunately, the number of types of preparable processed data can be semi-infinite especially for big data. In techniques described in, e.g., Jpn. Pat. Appln. KOKAI Publication No. 2012-14659 and Jpn. Pat. Appln. KOKAI Publication No. 2009-87190, therefore, it is impossible to use an optimum one of semi-infinite variations, so a variation obtainable by a clear-cut solution is used.

Similarly, the number of combinations (analytical methods) of analytical parameters to be used in analysis such as machine learning and variations of the above-described input data format can be semi-infinite.

Accordingly, it is impossible for Jpn. Pat. Appln. KOKAI Publication No. 2012-14659 and Jpn. Pat. Appln. KOKAI Publication No. 2009-87190 to use an optimum one of the semi-infinite analytical method combinations, so a variation obtainable by a clear-cut solution is used.

[2] When an input data trend has changed, the accuracy decreases if an extracted knowledge model is applied.

A knowledge model is extracted by performing machine learning by immediately preceding input data by using the same parameter as that used before. This makes it impossible to perform control when a new input attribute is beginning to have influence.

[3] It is difficult to automatically solve problems [1] and [2] at the same time.

For example, Jpn. Pat. Appln. KOKAI Publication No. 2012-14659 does not show the processing time of a recommendation generation process corresponding to a request from a user, and consideration on control of the load.

In addition, Jpn. Pat. Appln. KOKAI Publication No. 2012-14659 is a method which does not stock any analytical method based on the accuracy result in association with problems [1] and [2]. This makes it difficult to maintain the improvement.

Furthermore, Jpn. Pat. Appln. KOKAI Publication No. 2012-14659 only describes that "necessary data can be formed beforehand by using a log, and can also be formed at the timing of recommendation pattern determination" in an embodiment, and describes neither an implementation method nor a possible problem.

On the other hand, in the technique described in Jpn. Pat. Appln. KOKAI Publication No. 2009-87190, input data in problems [1] and [2] is limited to stream data, and no other input data format can be processed.

As explained above, the conventional data analyzing apparatus has three problems [1] to [3]. Accordingly, demands have arisen for the data analyzing apparatus to be able to use an optimum combination of an analytical parameter and input data format, and at the same time maintain the accuracy even when an input data trend has changed.

It is an object of the present invention to provide a data analyzing apparatus and program capable of using an optimum combination of an analytical parameter and input data format, and at the same time maintaining the accuracy even when an input data trend has changed.

BRIEF DESCRIPTION OF THE DRAWINGS

FIG. 1 is a schematic view showing the arrangement of a data analyzing apparatus according to the first embodiment.

FIG. 2 is a schematic view showing the arrangement of an analytical method list table in the first embodiment.

FIG. 3 is a schematic view showing the arrangement of a format variation candidate setting list in the first embodiment.

FIG. 4 is a schematic view showing the arrangement of an analytical parameter method setting list in the first embodiment.

FIG. 7 is a schematic view showing the arrangement of a user setting threshold table in the second embodiment.

FIG. 8 is a schematic view showing the arrangement of a parallel execution related information table in the second embodiment.

DETAILED DESCRIPTION

Figure 5:
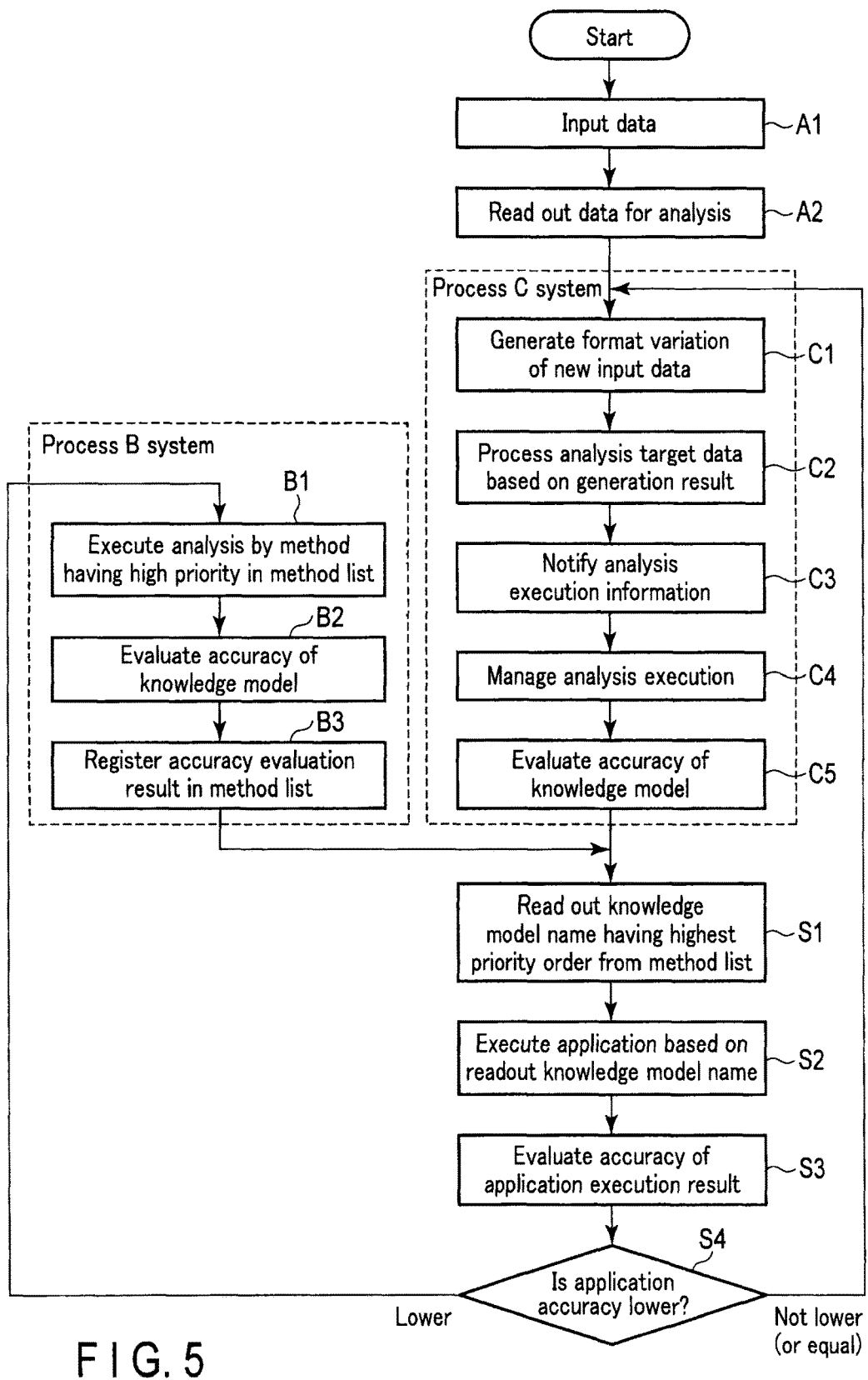
FIG. 5 is a flowchart for explaining an operation in the first embodiment.

In general, according to one embodiment, a data analyzing apparatus of an embodiment includes a first storage device, a format variation generating device, an input data processing device, an analytical parameter generating device, a first writing device, a first analysis executing device, an analytical result evaluating device, a second writing device, an application executing device, an application result evaluating device, a first determining device, a reactivating device, a designating device, and a second analysis executing device.

The first storage device stores a format variation, analytical algorithm name, analytical parameter, knowledge model name, and knowledge model accuracy in association with each other.

The format variation generating device generates a format variation of a combination not stored in the first storage device, based on a plurality of predetermined format variation candidates.

The input data processing device generates analysis target data by processing the format of input data based on the generated format variation.

The analytical parameter generating device generates a combination of an analytical algorithm name and analytical parameter not stored in the first storage device, based on predetermined analytical algorithm name candidates and an analytical parameter range.

The first writing device writes the generated format variation and the generated analytical algorithm name and analytical parameter in the first storage device.

The first analysis executing device executes analysis on the analysis target data based on the generated format variation and the generated analytical algorithm name and analytical parameter.

The analytical result evaluating device evaluates a knowledge model as the execution result of the analysis, and calculates a knowledge model accuracy.

The second writing device writes the knowledge model accuracy and knowledge model name of the evaluated knowledge model in the first storage device, in association with the written format variation, analytical algorithm name, and analytical parameter.

The application executing device performs the application, after the writing, based on a knowledge model having a knowledge model name associated with the highest knowledge model accuracy in the first storage device.

The application result evaluating device calculates the application accuracy by evaluating the execution result of the application.

The first determining device determines whether the calculated application accuracy is lower than the highest knowledge model accuracy.

The reactivating device reactivates the format variation generating device and analytical parameter generating device if the determination result is "not lower".

The designating device designates, if the determination result is "lower", a format variation associated with the highest knowledge model accuracy in the input data processing device, thereby obtaining new analysis target data from the input data processing device.

The second analysis executing device executes analysis based on the new analysis target data and the knowledge model name in the application, and transmits a knowledge model as the execution result of the analysis to the analytical result evaluating device.

Embodiments will be explained below with reference to the accompanying drawings. Prior to the explanation, however, an outline of each embodiment will be described.

The first embodiment is directed to a data analyzing apparatus capable of executing a process C system, process B system, and process S system.

In the process C system, an analytical method having a more appropriate combination is extracted from evaluation results by using generated new input data format variations and analytical parameters. Also, the analytical method is managed in a database, and update and management are performed. While finding an analytical method which is minimum and necessary for application, another more optimum analyzing method is found and registered in the database, and a more appropriate knowledge model is extracted.

In the process B system, when it is beginning to confirm a change in input data trend from the accuracy evaluation result, an appropriate knowledge model is extracted by selecting an analytical method from the registration database again, and the selected analytical method is reflected on the application of the knowledge model.

In the process S system, the process C system and process B system are switched based on the accuracy evaluation result.

The second embodiment is directed to a data analyzing system having a parallel distributed environment capable of executing the process C system, process B system, and process S system. This data analyzing system includes a plurality of computers capable of selectively executing the process B system and process C system, and the above-described data analyzing apparatus controls each computer. That is, the data analyzing apparatus of the second embodiment controls each computer based on the accuracy evaluation result so as to dynamically change the execution ratio of the process C system and process B system, thereby implementing a more accurate analytical application.

The foregoing are the outlines of the embodiments. Each embodiment will now be explained in detail. Note that the following data analyzing apparatus can be carried out by either a hardware configuration or a combination of hardware resources and software. As shown in, e.g., FIG. 1 or 6, an example of the software of this combination is a program which is installed in a computer from a network or a non-transitory computer-readable storage medium M in advance and causes the computer to implement the functions of the data analyzing apparatus when executed by a processor of the computer.

First Embodiment

FIG. 1 is a schematic view showing the arrangement of the data analyzing apparatus according to the first embodiment. This data analyzing apparatus is an apparatus for generating analysis target data by processing the format of input data having an objective variable and each variable as a candidate for an explanatory variable with respect to the objective variable, generating a knowledge model indicating the objective variable based on each variable by analyzing the analysis target data, and obtaining a new objective variable by applying the knowledge model to each variable of new input data.

More specifically, the data analyzing apparatus includes an input data storage unit 1, a method list storage unit 2, a format variation generation unit 3, an analytical parameter method generation unit 4, an input data processing unit 5, an analytical method and knowledge model management unit 6, an analysis execution management unit 7, an analysis execution unit 8, an analytical result evaluation unit 9, an application execution management unit 10, an application execution unit 11, and an application result evaluation unit 12.

The input data storage unit 1 temporarily stores analysis target data. This analysis target data does not depend on any specific format such as a CSV (Comma-Separated Value) format or key value format.

The method list storage unit 2 stores information of analytical methods. As shown in FIGS. 2 to 4, this information of analytical methods contains, e.g., an analytical method list table T1, format variation candidate setting list L1, and analytical parameter method setting list L2. However, the setting lists L1 and L2 are not essential and may also be omitted. For example, the setting lists L1 and L2 can be omitted by a modification in which the setting contents in the lists L1 and L2 are predetermined in the generation units 3 and 4.

As shown in FIG. 2, the analytical method list table T1 describes a priority order, analytical method ID, input data format variation, input data period, analytical algorithm name, analytical parameter, knowledge model name, knowledge model accuracy, knowledge model accuracy acquisition date/time, application accuracy, and application accuracy acquisition date/time in association with each other. However, the priority order, analytical method ID, input data period, knowledge model accuracy acquisition date/time, application accuracy, and application accuracy acquisition date/time are not essential and may also be omitted. More specifically, the analytical method ID, input data period, knowledge model accuracy acquisition date/time, and application accuracy acquisition date/time can be omitted because they are not directly used in the generation of a knowledge model by analysis execution, the calculation of knowledge model accuracy by analytical result evaluation, the generation of an application execution result by application execution, and the calculation of application accuracy by application result evaluation. The priority order can be omitted by a modification in which the priority order is replaced with a knowledge model accuracy order. The application accuracy can be omitted from the analytical method list table T1 by a modification in which the application accuracy is not described in the analytical method list table T1, and processes S4 and Y2 are executed by using a calculated application accuracy.

The priority order indicates the priority order of an analytical method to be used by the application execution unit 11, and is updated based on the knowledge model accuracy. More specifically, the priority order indicates the order of accuracy when a knowledge model is generated.

The input data format variation indicates a combination element of input data for analysis. The combination element includes an element (e.g., a weekly average) to be newly prepared, in addition to externally input data. More specifically, the input data format variation indicates a format processed by the input data processing unit 5.

The input data period indicates the generation period of data to be used in analysis by the analysis execution unit 8.

The analytical algorithm name (analytical parameter group) indicates the name of an analytical algorithm to be used when the analysis execution unit 8 executes analysis.

The analytical parameter (analytical parameter group) indicates a parameter to be used when the analysis execution unit 8 performs analysis by using the analytical algorithm. As the analytical parameter, it is possible to use, e.g., the depth and threshold in association analysis as needed.

The knowledge model name indicates a name for identifying the knowledge model generated by the analysis execution unit 8.

The knowledge model accuracy indicates the accuracy of knowledge model generation, and is obtained by the analytical result evaluation unit 9.

The knowledge model accuracy acquisition date/time indicates the date/time at which the knowledge model accuracy is acquired (generated).

The application accuracy indicates the result obtained by the application result evaluation unit 12 by evaluating the result obtained by the application execution unit 11 by applying the knowledge model generated by the analysis execution unit 8. More specifically, the application accuracy indicates the accuracy when the knowledge model is applied.

The application accuracy acquisition date/time indicates the date/time at which the application accuracy is acquired.

As shown in FIG. 3, the format variation candidate setting list L1 sets an item indicating a candidate for an input data format variation and a value in association with each other. In this example, a method of variation is set for each column indicating a group of items. This example shows items of two groups, i.e., time and place. A method to be used in a combination is basically one for each group in each column. For example, it is possible to combine "three-day average" in the "time" group and "state average" in the "place" group. However, "three-day average" and "weekly average" in the "time" group are basically not combined. More specifically, the format variation candidate setting list L1 describes a plurality of format variation candidates as candidates for a format variation.

As shown in FIG. 4, the analytical parameter method setting list L2 describes an analytical algorithm name, item, and value in association with each other.

The analytical algorithm name indicates the name of an analytical algorithm set by the user. More specifically, the analytical algorithm name in the analytical parameter method setting list L2 is an analytical algorithm name candidate (as a candidate for the analytical algorithm name in the analytical method list table T1).

The item indicates the name of a parameter item to be used in an analytical algorithm of the set analytical algorithm name.

The value indicates the amplitude (range) of a parameter of the set parameter item. More specifically, this value (range) is the range of an analytical parameter (as a candidate for the analytical parameter in the analytical method list table T1).

The format variation generation unit 3 generates an input data format variation having a combination not registered in the analytical method list table T1 of the method list storage unit 2, based on the format variation candidate setting list L1. In this generation, the format variation generation unit 3 refers to the format variation candidate setting list L1 of the method list storage unit 2 for the purpose of processing. More specifically, the format variation generation unit 3 performs generation by combining original data in the input data storage unit 1 and data processed and generated based on the format variation candidate setting list L1. For example, when processing is included, initial settings are performed in ascending order, the total number of items of externally input raw data and items of processing formats is m, and the number of combinations is limited to n, the format variation generation unit 3 generates n or less combinations of m or less items.

The analytical parameter method generating method 4 generates a new combination of an analytical parameter and analytical algorithm name not existing in the analytical method list table T1 of the method list storage unit 2, based on the analytical parameter method setting list L2.

For example, when initial settings are performed in ascending order and association analytical algorithms to depths 1, 2, and 3 exist in the analytical method list table T1, the analytical parameter method generation unit 4 performs generation so as to extract next depth 4.

The input data processing unit 5 processes input data based on the analytical method and the input data variation generation information designated from the knowledge model management unit 6, and generates analysis target data (of the designated format variation) from the input data. Examples of the analysis target data of the format variation are analysis target data obtained by processing the input data into a format of weekly average, and analysis target data obtained by processing the input data into a format of monthly average.

The analytical method and knowledge model management unit 6 is a central management functional unit of this system. The analytical method and knowledge model management unit 6 acquires the analysis target data output from the input data processing unit 5 and a high-priority-order analytical method output from the method list management, and transmits them to the analysis execution management unit 7. Then, the analytical method and knowledge model management unit 6 acquires the evaluation results output from the analytical result evaluation unit 9 and application result evaluation unit 12, and stores them in the method list storage unit 2.

Also, in order to extract a new analytical method, the analytical method and knowledge model management unit 6 extracts a method not existing in the analytical method list table T1 of the method list storage unit 2 by using the format variation generation unit 3 and analytical parameter method generation unit 4, stores the result in the method list storage unit 2, and transmits the result to the input parameter processing unit 5. Note that whether to give priority to the extracted contents of the format variation generation unit 3 or the extracted contents of the analytical parameter method generation unit 4 can be designated by the initial settings of the system.

More specifically, the analytical method and knowledge model management unit 6 as described above has following functions (f6-1) to (f6-12).

(f6-1) A first designating function of designating the format variation generated by the format variation generation unit 3 in the input data processing unit 5. Note that the first designating function is not essential and may also be omitted. For example, the first designating function can be omitted by a modification in which the format variation generation unit 3 designates the format variation in the input data processing unit 5 without using the analytical method and knowledge model management unit 6.

(f6-2) A first writing function of writing, in the analytical method list table T1, the format variation generated by the format variation generation unit 3 and the analytical algorithm and analytical parameter generated by the analytical parameter method generation unit 4.

(f6-3) A first notifying function of notifying the analysis execution management unit 7 of first analysis execution information containing the format variation, analytical algorithm name, and analytical parameter written by the first writing function. Note that the first notifying function is not essential and may also be omitted. For example, the first notifying function can be omitted by a modification in which the first writing function transmits the format variation, analytical algorithm name, and analytical parameter to the analysis execution management unit 7 or analysis execution unit 8 without using the first analysis execution information.

(f6-4) A second writing function of writing, in the analytical method list table T1, the knowledge model accuracy and knowledge model name of the knowledge model evaluated by the analytical result evaluation unit 9 in association with the format variation, analytical algorithm name, and analytical parameter written by the first writing function.

(f6-5) A priority order updating function of updating the value of the priority order in the analytical method list table T1 based on the knowledge model accuracy written by the second writing function. Note that the priority order updating function can be omitted because the priority order can be omitted as described above.

(f6-6) A first reading function of reading out a knowledge model name associated with the highest priority order in the analytical method list table T1 after update, and notifying the application execution management unit 10 of application execution information containing the knowledge model name. The first reading function can be omitted by a modification in which the highest priority order or application execution information is omitted.

(f6-7) A third writing function of writing, in the analytical method list table T1, the application accuracy calculated by the application result evaluation unit 12 in association with the knowledge model and knowledge model name during application. The third writing function can be omitted by a modification in which the application accuracy is not described in the analytical method list table T1 as described previously.

(f6-8) A first determining function of determining whether the application accuracy written by the third writing function is lower than the knowledge model accuracy associated with the application accuracy in the analytical method list table T1. The first determining function can be modified into "a function of determining whether the application accuracy calculated by the application result evaluation unit 12 is lower than the highest knowledge model accuracy" in a modification by which neither the priority order nor the application accuracy is described in the analytical method list table T1.

(f6-9) A reactivating function of reactivating, if the determination result is "not lower", the format variation generation unit 3 and analytical parameter method generation unit 4 so as to reexecute the format variation generation unit 3, first designating function (f6-1), input data processing unit 5, analytical parameter method generation unit 4, first writing function (f6-2), first notifying function (f6-3), first analysis executing device, analytical result evaluation unit 9, second writing function (f6-4), and priority order updating function (f6-5). The reactivating function need only reactivate the format variation generation unit 3 and analytical parameter method generation unit 4. Therefore, it is also possible to omit "so as to reexecute the format variation generation unit 3, first designating function (f6-1), input data processing unit 5, analytical parameter method generation unit 4, first writing function (f6-2), first notifying function (f6-3), first analysis executing device, analytical result evaluation unit 9, second writing function (f6-4), and priority order updating function (f6-5)".

(f6-10) A second reading function of reading out, if the determination result is "lower", a format variation and knowledge model name associated with the highest priority order in the analytical method list table T1. The first determining function can be modified into "a function of reading out a format variation associated with the highest knowledge model accuracy" in a modification by which the priority is not described in the analytical method list table T1. Note that the knowledge model name is not necessarily read out from the analytical list table T1.

(f6-11) A second designating function of obtaining new analysis target data from the input data processing unit 5 by designating the format variation read out by the second reading function in the input data processing unit 5. The second designating function may also be referred to as a designating function by a modification in which the first designating function is omitted.

(f6-12) A second notifying function of notifying the analysis execution management unit 7 of second analysis execution information containing the above-mentioned analysis target data and the knowledge model name read out by the second reading function. Note that the second notifying function is not essential and may also be omitted. For example, the second notifying function can be omitted by a modification in which the second reading function does not read out the knowledge model name, and the second designating function transmits the new analysis target data to the analysis execution management unit 7 or analysis execution unit 8 without using the second notifying function.

The analysis execution management unit 7 manages analysis execution by the analysis execution unit 8 based on analysis target data and analytical method output from the analytical method and knowledge model management unit 6. Note that the analysis execution management unit 7 can be omitted when management of, e.g., error retry is not performed on the analysis execution unit 8.

The analysis execution unit 8 performs an analyzing process based on the data output from the analysis execution management unit 7. More specifically, the analysis execution management unit 7 and analysis execution unit 8 form a first analysis executing device configured to execute analysis on analysis target data based on the first analysis execution information containing the analysis target data, format variation, analytical algorithm name, and analytical parameter. Also, the analysis execution management unit 7 and analysis execution unit 8 form a second analysis executing device configured to execute analysis based on the second analysis execution information containing the new analysis target data and knowledge model name, and transmitting a knowledge model as the execution result of the analysis to the analytical result evaluation unit 9. The second analysis executing device can be modified into "a second analysis executing device configured to execute analysis based on the new analysis target data and the knowledge model name during application, and transmitting a knowledge model as the execution result of the analysis to the analytical result evaluation unit 9" in a modification by which the second reading function does not read out the knowledge model name and the second analysis execution information is omitted.

The analytical result evaluation unit 9 evaluates the analytical result output from the analysis execution unit 8. More specifically, the analytical result evaluation unit 9 evaluates a knowledge model as the execution result of analysis, and calculates a knowledge model accuracy indicating the accuracy of the knowledge model.

The application execution management unit 10 manages execution by the application execution unit 11 based on the information output from the analytical method and knowledge model management unit 6. Note that the application execution management unit 10 can be omitted when management of, e.g., error retry is performed on the application execution unit 11.

The application execution 11 performs knowledge processing by using the knowledge model designated by the application execution management unit 10. The application execution unit 11 is equivalent to, e.g., a functional unit of CEP (Complex Event Processing). More specifically, the application execution management unit 10 and application execution unit 11 form an application executing device configured to execute application, based on a knowledge model having the knowledge model name in the application execution information notified from the analytical method and knowledge model management unit 6. The application executing device can be modified into "an application executing device configured to execute application of new input data, after writing by the second writing function, based on a knowledge model having a knowledge model name associated with the highest knowledge model accuracy in the analytical method list table T1" in a modification by which the priority order and application execution information are omitted.

The application result evaluation unit 12 evaluates the operation result based on the result output from the application execution unit 11. More specifically, the application result evaluation unit 12 evaluates an objective variable as the execution result of application, and calculates an application accuracy indicating the accuracy of a knowledge model in the application.

Next, the operation of the data analyzing apparatus configured as described above will be explained with reference to a flowchart shown in FIG. 5. This data analyzing apparatus sequentially executes the process A system (an input accepting process), the process C system (a new method generating process), and the process S system (a switching process). After that, the data analyzing apparatus repetitively executes the process C system or process B system (an existing method improving process) corresponding to the result of the process S system, and the process S system.

First, the data analyzing apparatus executes the process A system including processes A1 and A2.

In process A1, a communication interface (not shown), for example, receives input data from an external data collecting apparatus, and writes the input data in the input data storage unit 1.

In process A2, the input data processing unit 5 reads out the input data from the input data storage unit 1.

Thus, the data analyzing apparatus terminates the execution of the process A system.

Subsequently, the data analyzing apparatus executes the process C system including processes C1 to C5.

In process C1, the analytical method and knowledge model management unit 6 activates the format variation generation unit 3. The format variation generation unit 3 generates an input data format variation not existing in the analytical method list table T1 in the method list storage unit 2 from the format variation candidate setting list L1, and transmits the generation result to the analytical method and knowledge model management unit 6.

Similarly, the analytical method and knowledge model management unit 6 activates the analytical parameter method generation unit 4. The analytical parameter method generation unit 4 generates a combination of an analytical algorithm name and analytical parameter not existing in the analytical method list table T1 in the method list storage unit 2 from the analytical parameter method setting list L2, and transmits the generation result to the analytical method and knowledge model management unit 6.

The analytical method and knowledge model management unit 6 writes the generated input data format variation, analytical algorithm name, and analytical parameter in the analytical method list table T1 in the method list storage unit 2, and transmits variation generation information indicating the input data format variation to the input data processing unit 5.

In process C2, the input data processing unit 5 processes analysis target data based on this variation generation information, and transmits the processed analysis target data to the analytical method and knowledge model management unit 6.

In process C3, the analytical method and knowledge model management unit 6 notifies the analysis execution management unit 7 of analysis execution information containing the analysis target data processed in process C2, and the analytical algorithm name and analytical parameter written in the analytical method list table T1 in process C1.

In process C4, the analysis execution management unit 7 transmits this analysis execution information to the analysis execution unit 8, and manages analysis execution by the analysis execution unit 8. The analysis execution unit 8 executes analysis on the analysis target data based on the transmitted analysis execution information, and transmits a knowledge model obtained by the analysis to the analytical result evaluation unit 9.

In process C5, the analytical result evaluation unit 9 evaluates the accuracy of this knowledge model, and transmits the obtained knowledge model accuracy and the knowledge model accuracy acquisition date/time to the analytical method and knowledge model management unit 6. The analytical method and knowledge model management unit 6 writes the knowledge model accuracy and knowledge model accuracy acquisition date/time in the analytical method list table T1 in the method list unit 2. As the knowledge model accuracy, it is possible to use, e.g., the precision or recall.

Thus, the data analyzing apparatus terminates the execution of the process C system.

Subsequently, the data analyzing apparatus executes the process S system including processes S1 to S4.

In process S1, the analytical method and knowledge model management unit 6 reads out a knowledge model name associated with the priority order indicating "the first place" from the analytical method list table T1 in the method list storage unit 2, and notifies the application execution management unit 10 of application execution information containing the knowledge model name.

In process S2, the application execution management unit 10 transmits this application execution information to the application execution unit 11, and manages application execution by the application execution unit 11. The application execution unit 11 executes application of the input data based on the transmitted application execution information, and transmits the application execution result to the analytical result evaluation unit 9.

In process S3, the application result evaluation unit 12 evaluates the accuracy of this application execution result, and transmits the obtained application accuracy and application accuracy acquisition date/time to the analytical method and knowledge model management unit 6. The analytical method and knowledge model management unit 6 writes the application accuracy and application accuracy acquisition date/time received from the application result evaluation unit 12 in the analytical method list table T1 of the method list unit 2. As the application accuracy, it is possible to use, e.g., the precision or recall.

In process S4, the analytical method and knowledge model management unit 6 determines whether the application accuracy written in process S3 is lower than the knowledge model accuracy in the analytical method list table T1.

If it is determined that the application accuracy is lower than the knowledge model accuracy, a trouble has occurred in application by the previous knowledge model because the input data trend has changed from that when the knowledge model is acquired. In this state, it is necessary to immediately switch the presently applied knowledge model to a more accurate knowledge model. Accordingly, the process B system for increasing the accuracy of the existing method is immediately selected.

On the other hand, if it is determined in process S4 that the application accuracy is not lower than (or equal to) the knowledge model accuracy, no trouble has occurred in application by the previous knowledge model. In this state, no immediate countermeasure is necessary, so there is an extra time for generating a more accurate new knowledge model. Therefore, the process C system for generating a more accurate new method is selected although the processing time is longer than that of the process B system.

Thus, the data analyzing apparatus terminates the execution of the process S system.

After that, the data analyzing apparatus repetitively executes the process C system or process B system corresponding to the result of the process S system, and the process S system.

Note that the operation when executing the process C system is described above, so an operation when executing the process B system will be described below.

The data analyzing apparatus executes the process B including processes B1 to B3.

In process B1, the analytical method and knowledge model management unit 6 reads out the input data format variation and knowledge model name associated with the priority order indicating "the first place" from the analytical method list table T1 in the method list storage unit 2.

The analytical method and knowledge model management unit 6 transmits variation generation information indicating the input data format variation to the input data processing unit 5.

The input data processing unit 5 processes the analysis target data based on this variation generation information, and transmits the processed analysis target data to the analytical method and knowledge model management unit 6. The processed analysis target data is obtained by processing newly acquired input data, and reflects the change in input data trend.

The analytical method and knowledge model management unit 6 notifies the analysis execution management unit 7 of the processed analysis target data and the readout knowledge model name. The purpose of this notification is to correct a knowledge model indicated by the existing knowledge model name with respect to the analysis target data having the changed trend.

The analysis execution management unit 7 transmits the analysis target data and knowledge model name to the analysis execution unit 8, and manages analysis execution by the analysis execution unit 8. The analysis execution unit 8 executes analysis on the analysis target data based on the transmitted analysis target data and knowledge model name, and transmits a knowledge model obtained by the analysis to the analytical result evaluation unit 9.

In process B2, the analytical result evaluation unit 9 evaluates the accuracy of this knowledge model, and transmits the obtained knowledge model accuracy and knowledge model accuracy acquisition date/time to the analytical method and knowledge model management unit 6. As the knowledge model accuracy, it is possible to use, e.g., the precision or recall.

In process B3, the analytical method and knowledge model management unit 6 writes the knowledge model accuracy and knowledge model accuracy acquisition date/time in the analytical method list table T1 of the method list unit 2.

Thus, the data analyzing apparatus terminates the execution of the process B system.

Subsequently, the data analyzing apparatus executes the process S system. After that, the data analyzing apparatus repetitively executes the process C system or process B system corresponding to the result of the process S system, and the process S system.

In this embodiment as described above, a knowledge model based on a method combining an analytical parameter and input data format is applied. If the application accuracy is low, a knowledge model is regenerated based on input data and the existing method. If the application accuracy is not low, a knowledge model is generated based on input data and a new method. This makes it possible to use an optimum combination of an analytical parameter and input data format, and maintain the accuracy even when the trend of input data has changed.

That is, it is possible to simultaneously solve the three conventional problems, improve the accuracy by causing the process B system of improving the existing method and the process C system of generating a new method to interact with each other, and extract an accurate knowledge model taking account of various combinations.

It is also possible to immediately start application using the analytical result, and continuously and automatically improve the accuracy of the application result.

Note that as described previously, this embodiment can have the modification in which the setting lists L1 and L2 are omitted, the priority order, application accuracy, and the like in the table T1 are omitted, the first designating function, each notifying function, and each reading function in the analytical method and knowledge model management unit 6 are omitted, and the analysis execution management unit 7 and application execution management unit 10 are omitted. This modification operates as follows.

The method list storage unit 2 stores the analytical method list table T1. The analytical method list table T1 describes the format variation, analytical algorithm name, analytical parameter, knowledge model, and knowledge model accuracy in association with each other.

The format variation generation unit 3 generates a format variation combination not stored in the analytical method list table T1, based on a plurality of predetermined format variation candidates.

The input data processing unit 5 processes the format of input data and generates analysis target data based on the generated format variation.

The analytical parameter method generation unit 4 generates a combination of an analytical algorithm name and analytical parameter not stored in the analytical method list table T1, based on a predetermined analytical algorithm name candidate and the range of analytical parameters.

The analytical method and knowledge model management unit 6 writes the generated format variation and the generated analytical algorithm name and analytical parameter in the analytical method list table T1.

The analysis execution unit 8 executes analysis on the analysis target data based on the written format variation, analytical algorithm name, and analytical parameter.

The analytical result evaluation unit 9 evaluates a knowledge model as the execution result of the analysis, and calculates the knowledge model accuracy.

The analytical method and knowledge model management unit 6 writes the knowledge model accuracy and knowledge model name of the evaluated knowledge model in the analytical method list table T1 in association with the written format variation, analytical algorithm name, and analytical parameter.

After this write, the application execution unit 11 executes application of new input data based on a knowledge model name of a knowledge model associated with the highest knowledge model accuracy in the analytical method list table T1.

The application result evaluation unit 12 evaluates the execution result of the application and calculates the application accuracy.

The analytical method and knowledge model management unit 6 determines whether the calculated application accuracy is lower than the highest knowledge model accuracy.

If the determination result is "not lower", the analytical method and knowledge model management unit 6 reactivates the format variation generation unit 3 and analytical parameter method generation method 4.

On the other hand, if the determination result is "lower", the analytical method and knowledge model management unit 6 designates a format variation associated with the highest knowledge model accuracy in the input data processing unit 5, thereby obtaining new analysis target data from the input data processing unit 5.

The analysis execution unit 8 executes analysis based on the new analysis target data and the knowledge model name in application, and transmits a knowledge model as the execution result of this analysis to the analytical result evaluation unit 9.

The same effects as those of the first embodiment can be obtained by this modification as well. Also, this modification is similarly applicable to the following second embodiment.

Second Embodiment

Figure 6:
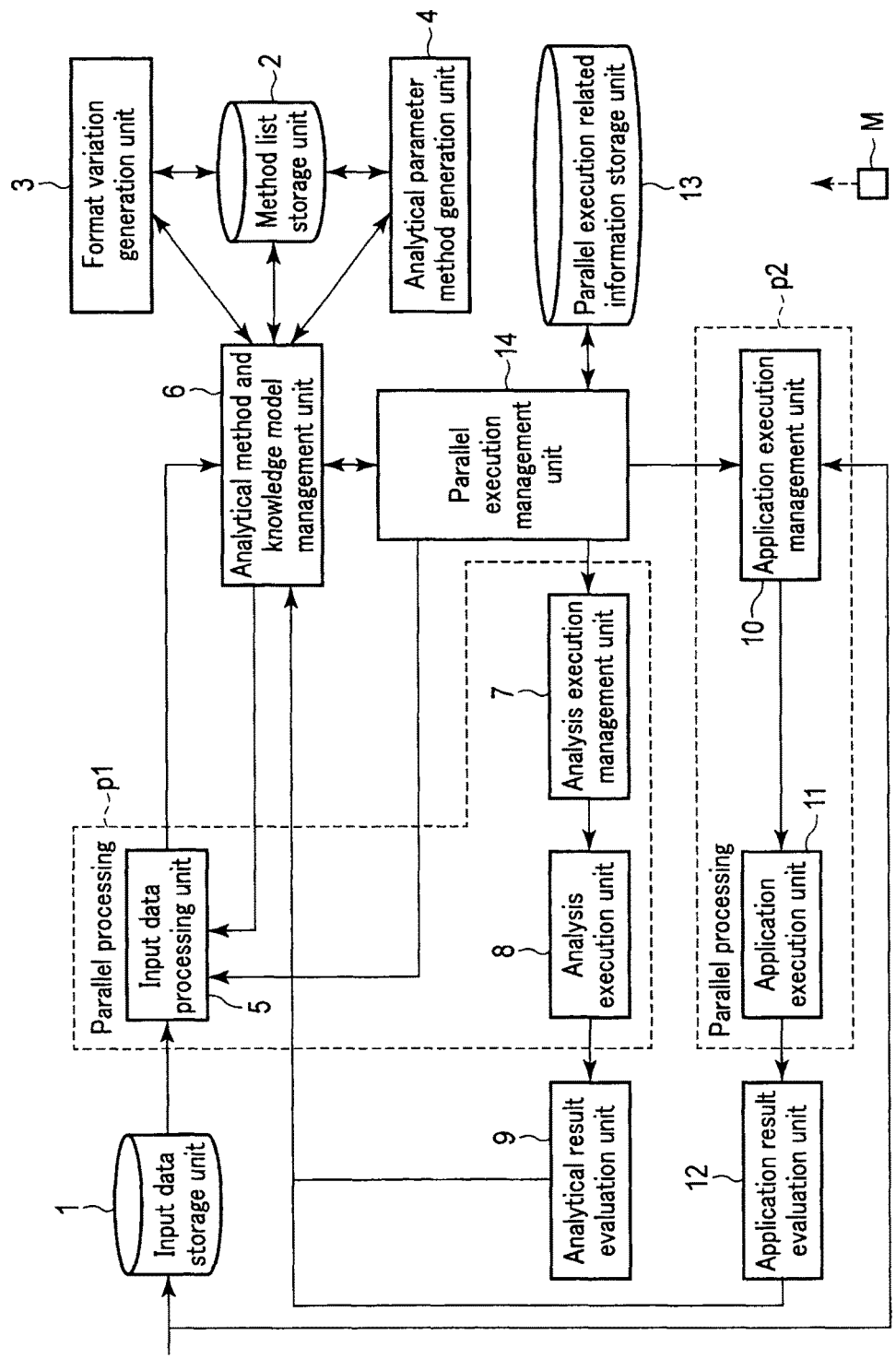
FIG. 6 is a schematic view showing the arrangement of a data analyzing system according to the second embodiment.

FIG. 6 is a schematic view showing the arrangement of a data analyzing system including a data analyzing apparatus according to the second embodiment. The same reference numerals as in FIG. 1 denote substantially the same portions in FIG. 6, and a repetitive explanation will be omitted. In this embodiment, different portions will mainly be described.

The second embodiment is a modification of the first embodiment, and has an arrangement which executes the process B system and process C system in parallel while adjusting the execution ratio of the process B system and process C system in accordance with the application accuracy.

More specifically, in addition to the arrangement shown in FIG. 1, the data analyzing apparatus further comprises a parallel execution related information storage unit 13 and parallel execution management unit 14 for adjusting the execution ratio of the process B system and process C system. The data analyzing system includes the data analyzing apparatus shown in FIG. 6, and further includes a plurality of computers indicated by broken lines p1 and p2 in FIG. 6, which include an input data processing unit 5, analysis execution management unit 7, analysis execution unit 8, application execution management unit 10, and application execution unit 11. These computers are managed by the parallel execution management unit 14, and can selectively execute the units 5, 7, and 8 for the process B system or process C system, and the units 10 and 11 for processes S1 and S2.

Accordingly, a method list storage unit 2 further stores a user setting threshold table T2.

The user setting threshold table T2 describes a knowledge model accuracy lower limit and application accuracy lower limit in association with each other.

The knowledge model accuracy lower limit indicates the lower limit of knowledge model accuracy set by the user.

The application accuracy lower limit indicates the lower limit of application accuracy set by the user.

The parallel execution related information storage unit 13 stores information for generating and applying a knowledge model while adjusting the parallel execution ratio. In this example, the information in the parallel execution related information storage unit 13 is a parallel execution related information table T3.

The parallel execution related information table T3 describes a machine name, use status, use method type, analytical method ID, and knowledge model name in association with each other.

The machine name indicates a name which identifies a computer (machine) for executing parallel processing.

The use status indicates the current use status of the computer. The use status is "in use" when a job is input, and "free" when no job is input.

The use method type indicates the type of use method of each computer such as "knowledge model generation using existing method" (the process B system) or "knowledge model generation using new method" (the process C system).

The analytical method ID indicates an analytical method ID used by a job of the computer.

The knowledge model name indicates a knowledge model name used by a job of the computer.

Accordingly, an analytical method and knowledge model management unit 6 further includes following functions (f6-13) to (f6-15) in addition to the above-described functions (f6-1) to (f6-12).

(f6-13) A third reading function of reading out a knowledge model accuracy associated with an application accuracy written by the third writing function (f6-7) from an analytical method list table T1.

(f6-14) A second determining function of determining whether the application accuracy written by the third writing function (f6-7) is lower than the application accuracy lower limit.

(f6-15) A third determining function of determining whether the knowledge model accuracy read out by the third reading function is lower than the knowledge model accuracy lower limit.

On the other hand, the parallel execution management unit 14 manages the parallel processing of each computer by referring to the parallel execution related information table T3 in the parallel execution related information storage unit 13.

More specifically, the parallel execution management unit 14 has following functions (f14-1) to (f14-6).

(f14-1) A communicating function capable of communicating with a plurality of computers including units 5, 7, 8, 10, and 11 identical to the units 5, 7, 8, 10, and 11.

(f14-2) A first updating function of performing update, if the determination result of the second determining function (f6-14) is "lower", and the determination result of the third determining function (f6-15) is "not lower", so as to increase the setting of the existing method types pertaining to the input data processing unit 5, the second analysis executing device, and the application executing device as much as possible, among the use method types of the computers.

(f14-3) A second updating function of performing update, if the determination result of the second determining function (f6-14) is "lower", and the determination result of the third determining function (f6-15) is "lower", so as to increase the setting of new method types pertaining to the input data processing unit 5, the first analysis executing device, and the application executing device, among the use method types of the computers.

(f14-4) A third updating function of performing update, if the determination result of the second determining function (f6-14) is "not lower", and the determination result of the third determining function (f6-15) is "not lower", so as to increase the setting of the existing method types among the use method types of the computers.

(f14-5) A fourth updating function of performing update, if the determination result of the second determining function (f6-14) is "not lower", and the determination result of the third determining function (f6-15) is "lower", so as to increase the setting of new method types among the use method types of the computers.

(f14-6) An execution instructing function of transmitting, after the update of the setting, an execution instruction for each means pertaining to the use method type in the parallel execution related information table T3 by using the communicating function (f14-1).

Next, the operation of the data analyzing system configured as described above will be explained with reference to a flowchart shown in FIG. 9. Note that an explanation of the operations described in the first embodiment will be omitted.

Assume that the data analyzing apparatus has executed the process A system, the process C system, and processes S1 and S2.

Figure 9:
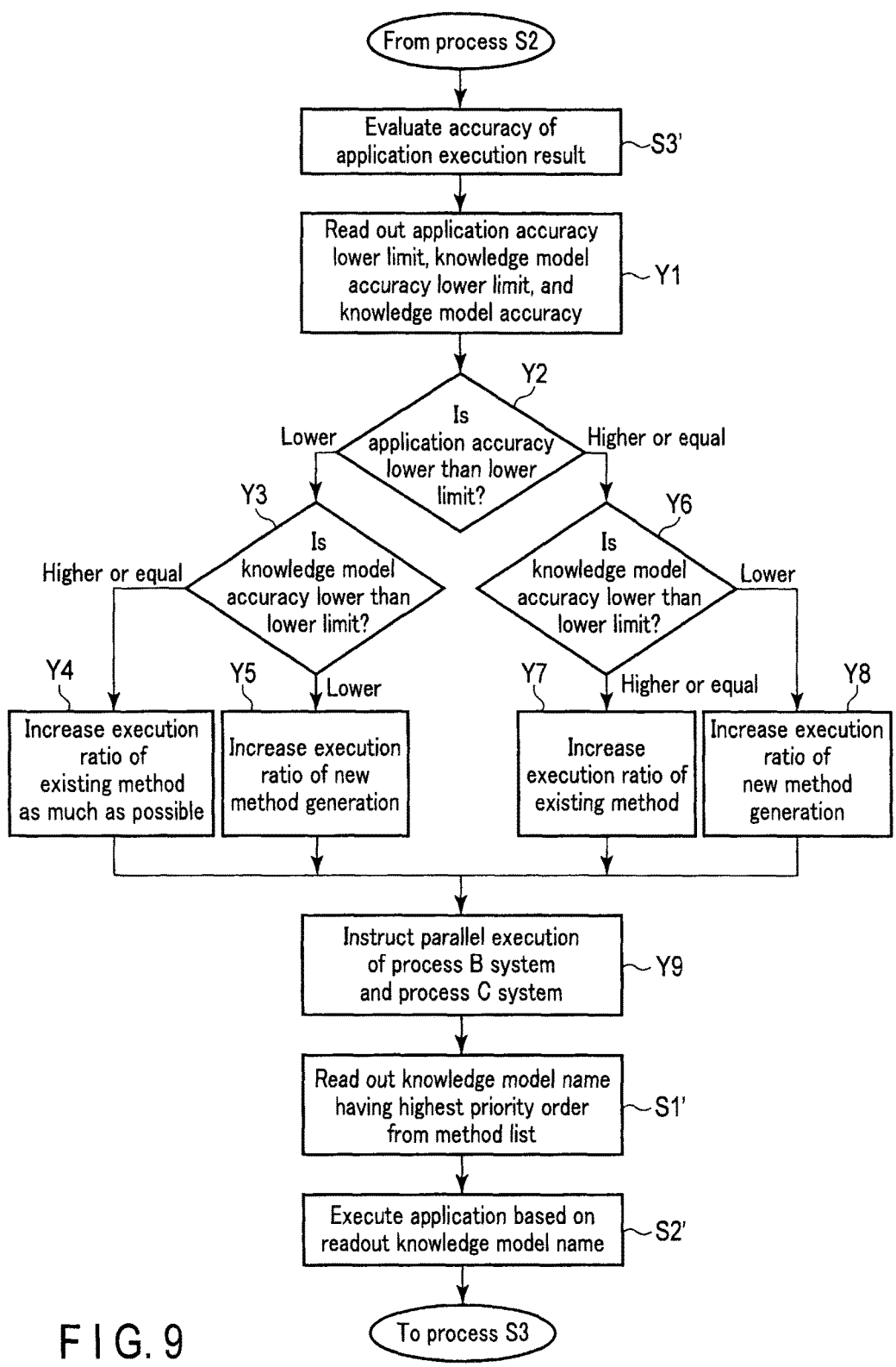
FIG. 9 is a flowchart for explaining an operation in the second embodiment.

In process S3' shown in FIG. 9, an application result evaluation unit 12 evaluates the accuracy of the application execution result transmitted in process S2, and transmits the obtained application accuracy and application accuracy acquisition date/time to the analytical method and knowledge model management unit 6. The analytical method and knowledge model management unit 6 writes the application accuracy and application accuracy acquisition date/time received from the application result evaluation unit 12 in the analytical method list table T1 of the method list unit 2.

In process Y1, the analytical method and knowledge model management unit 6 reads out the application accuracy lower limit and knowledge model accuracy lower limit from the user setting threshold table T2 in the method list storage unit 2. Also, the analytical method and knowledge model management unit 6 reads out the knowledge model accuracy from the analytical method list table T1 in the method list storage unit 2.

In process Y2, the analytical method and knowledge model management unit 6 determines whether the application accuracy received in process S3' is lower than the application accuracy lower limit.

In process Y3, if the determination result in Y2 is "lower", the analytical method and knowledge model management unit 6 determines whether the knowledge model accuracy is lower than the knowledge model accuracy lower limit.

In process Y4, if the determination result in Y3 is "not lower" (higher or equal), the analytical method and knowledge model management unit 6 transmits the use type "knowledge model generation using existing method" and the execution ratio "increase to maximum" to the parallel execution management unit 14. Based on these use type and execution ratio, the parallel execution management unit 14 updates the settings of the parallel execution related information table T3 so as to "increase to maximum" the settings of the use status "in use", the use method type "knowledge model generation using existing method", the analytical method ID "M008", and the knowledge model name "B_20110301". Note that the execution ratio of the use method type "knowledge model generation using existing method" is represented by the number of lines (the number of machines) of the use method type "knowledge model generation using existing method"/(the number of lines of the use method type "knowledge model generation using existing method"+the number of lines of the use method type "knowledge model generation using new method").

In process Y5, if the determination result in Y3 is "lower", the analytical method and knowledge model management unit 6 transmits the use type "knowledge model generation using new method" and the execution ratio "increase" to the parallel execution management unit 14. Based on these use type and execution ratio, the parallel execution management unit 14 updates the settings of the parallel execution related information table T3 so as to "increase" the settings of, e.g., the use status "in use", the use method type "knowledge model generation using new method", the analytical method ID "blank", and the knowledge model name "blank". Note that the execution ratio of the use method type "knowledge model generation using new method" is represented by the number of lines (the number of machines) of the use method type "knowledge model generation using new method"/the number of lines of the use method type "knowledge model generation using existing method"+the number of lines of the use method type "knowledge model generation using new method").

On the other hand, in process Y6, if the determination result in Y2 is "not lower" (higher or equal), the analytical method and knowledge model management unit 6 determines whether the knowledge model accuracy is lower than the knowledge model accuracy lower limit.

In process Y7, if the determination result in Y6 is "not lower" (higher or equal), the same processing as in process Y4 is executed. Since, however, the execution ratio is "increase", update is so performed as to "increase" the settings of the parallel execution related information table T3.

In process Y8, if the determination result in Y3 is "lower", the same processing as in process Y5 is executed.

In process Y9, the parallel execution management unit 14 instructs the computers to execute the process B system or process C system in parallel based on the updated parallel execution related information table T3.

After that, in process S1', the analytical method and knowledge model management unit 6 reads out a knowledge model name associated with the priority order indicating "the first place" from the analytical method list table T1 in the method list storage unit 2, and notifies the application execution management unit 10 of application execution information containing the readout knowledge model name.

In process S2', the application execution management unit 10 transmits this application execution information to the application execution unit 11, and manages application execution by the application execution unit 11. The application execution unit 11 executes application of the input data based on the transmitted application execution information, and transmits the application execution result to the analytical result evaluation unit 9.

Subsequently, the data analyzing apparatus advances to process S3 described in FIG. 5. After process S3, the data analyzing apparatus executes the process C system or process B system corresponding to the result of process S1 described in FIG. 5, and processes S1 and S2. After process S2 described in FIG. 5, the data analyzing apparatus returns to process S3' of this embodiment, and executes the processing as described above. That is, the second embodiment alternately repetitively executes the processing described in FIG. 5 and the processing described in FIG. 9.

As described above, this embodiment determines whether the application accuracy is lower than the application accuracy lower limit, determines whether the knowledge model accuracy is lower than the knowledge model accuracy lower limit, and, based on these determination results, increases the settings of the new method type or existing method type of the use method types of each computer. In addition to the effects of the first embodiment, therefore, it is possible to extract an accurate knowledge model more rapidly and more accurately, and increase the accuracy of the application result, while automatically changing the execution ratio of the new method type and existing method type in the parallel computer environment.

In at least one embodiment explained above, a knowledge model based on a method combining an analytical parameter and input data format is applied. If the application accuracy is low, a knowledge model is regenerated based on the input data and existing method. If the application accuracy is not low, a knowledge model is generated based on the input data and a new method. This makes it possible to use an optimum combination of an analytical parameter and input data format, and maintain the accuracy even when the trend of input data has changed.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data analyzing apparatus, comprising:
a first storage device configured to store a format variation, an analytical algorithm name, an analytical parameter, a knowledge model name, and a knowledge model accuracy in association with each other;
a format variation generating device configured to generate a format variation of a combination not stored in the first storage device based on a plurality of predetermined format variation candidates;
an input data processing device configured to generate analysis target data by processing a format of input data based on the generated format variation;
an analytical parameter generating device configured to generate a combination of an analytical algorithm name and an analytical parameter not stored in the first storage device, based on a predetermined analytical algorithm name candidate and an analytical parameter range;
a first writing device configured to write the generated format variation and the generated analytical algorithm name and analytical parameter in the first storage device;
a first analysis executing device configured to execute analysis on the analysis target data based on the written format variation, an analytical algorithm corresponding to the analytical algorithm name, and the analytical parameter;
an analytical result evaluating device configured to evaluate a knowledge model as an execution result of the analysis, and calculate a knowledge model accuracy;
a second writing device configured to write, in the first storage device, a knowledge model accuracy and knowledge model name of the evaluated knowledge model in association with the written format variation, the analytical algorithm name, and the analytical parameter;
an application executing device configured to execute application of new input data after the writing, based on a knowledge model having a knowledge model name associated with a highest knowledge model accuracy in the first storage device;
an application result evaluating device configured to evaluate an execution result of the application and calculate an application accuracy;
a first determining device configured to determine whether the calculated application accuracy is lower than the highest knowledge model accuracy;
a reactivating device configured to reactivate the format variation generating device and the analytical parameter generating device if a result of the determination is "not lower";
a designating device configured to designate, if the result of the determination is "lower", a format variation associated with the highest knowledge model accuracy in the input data processing device, to obtain new analysis target data from the input data processing device; and
a second analysis executing device configured to execute analysis based on the new analysis target data and the knowledge model name in application, and transmit a knowledge model as an execution result of the analysis to the analytical result evaluating device.

2. A data analyzing apparatus for generating analysis target data by processing a format of input data having an objective variable and each variable as a candidate for an explanatory variable for the objective variable, generating a knowledge model indicating the objective variable based on each variable by analyzing the analysis target data, and obtaining a new objective variable by applying the knowledge model to each variable of new input data, comprising:
a first storage device configured to store, in association with each other, a priority order indicating an order of accuracy when the knowledge model is generated, a format variation indicating the processed format, an analytical algorithm name used in the analysis, an analytical parameter used in the analysis, a knowledge model name for identifying the knowledge model, a knowledge model accuracy indicating accuracy when the knowledge model is generated, and an application accuracy indicating accuracy when the knowledge model is applied;
a second storage device configured to store a plurality of format variation candidates as candidates for the format variation;
a format variation generating device configured to generate a format variation of a combination not stored in the first storage device based on each format variation candidate;
a first designating device configured to designate the generated format variation;
an input data processing device configured to execute the processing based on the designated format variation, thereby generating the analysis target data from the input data;
a third storage device configured to store an analytical algorithm name candidate as a candidate for the analytical algorithm name, and a range of analytical parameters as candidates for the analytical parameter, in association with each other;
an analytical parameter generating device configured to generate a combination of an analytical algorithm name and an analytical parameter not stored in the first storage device, based on the analytical algorithm name candidate and the analytical parameter range;
a first writing device configured to write the generated format variation and the generated analytical algorithm name and analytical parameter in the first storage device;
a first notifying device configured to notify first analysis execution information containing the generated analysis target data, and the format variation, the analytical algorithm name, and the analytical parameter written by the first writing device;
a first analysis executing device configured to execute the analysis based on the first analysis execution information;
an analytical result evaluating device configured to evaluate a knowledge model as an execution result of the analysis, and calculate a knowledge model accuracy indicating accuracy of the knowledge model;
a second writing device configured to write the knowledge model accuracy and a knowledge model name of the evaluated knowledge model in the first storage device in association with the format variation, the analytical algorithm name, and the analytical parameter written by the first writing device;
a priority order updating device configured to update a value of a priority order in the first storage device based on the knowledge model accuracy written by the second writing device;
a first reading device configured to read out a knowledge model name associated with a highest priority order in the first storage device after the update, and notifying application execution information containing the knowledge model name;

an application executing device configured to execute the application based on a knowledge model having the knowledge model name in the application execution information;

an application result evaluating device configured to evaluate an objective variable as an execution result of the application, and calculate an application accuracy indicating accuracy of the knowledge model in the application;

a third writing device configured to write the calculated application accuracy in the first storage device in association with the knowledge model name of the knowledge model in the application;

a first determining device configured to determine whether the application accuracy written by the third writing device is lower than a knowledge model accuracy associated with the application accuracy in the first storage device;

a reactivating device configured to reactivate the format variation generating device and the analytical parameter generating device, if a result of the determination is "not lower", thereby reexecuting the foil rat variation generating device, the first designating device, the input data processing device, the analytical parameter generating device, the first writing device, the first notifying device, the first analysis executing device, the analytical result evaluating device, the second writing device, and the priority order updating device;

a second reading device configured to read out, if the result of the determination is "lower", a format variation and a knowledge model name associated with a highest priority order in the first storage device;

a second designating device configured to designate the format variation read out by the second reading device in the input data processing device, thereby obtaining new analysis target data from the input data processing device;

a second notifying device configured to notify second analysis execution information containing the new analysis target data, and the knowledge model name read out by the second reading device; and a second analysis executing device configured to execute analysis based on the second analysis execution information, and transmit a knowledge model as an execution result of the analysis to the analytical result evaluating device.

3. The data analyzing apparatus according to claim 2, further comprising:

a communicating device configured to communicate with a plurality of computers comprising an input data processing device, a first analysis executing device, an application executing device, and a second analysis executing device respectively identical to the input data processing device, the first analysis executing device, the application executing device, and the second analysis executing device;

a fourth storage device configured to store a knowledge model accuracy lower limit indicating a lower limit of the knowledge model accuracy, and an application accuracy lower limit indicating a lower limit of the application accuracy;

a fifth storage device configured to store, in association with each other, a machine name identifying each computer, a use status of each computer, a use method type of each computer, and a knowledge model name used by each computer;

a third reading device configured to read out, from the first storage device, a knowledge model accuracy associated with the application accuracy written by the third writing device;

a second determining device configured to determine whether the application accuracy written by the third writing device is lower than the application accuracy lower limit;

a third determining device configured to determine whether the knowledge model accuracy read out by the third reading device is lower than the knowledge model accuracy lower limit;

a first updating device configured to perform update, if the determination result of the second determining device is "lower", and the determination result of the third determining device is "not lower", thereby increasing, as much as possible, a setting of an existing method type pertaining to the input data processing device, the second analysis executing device, and the application executing device, among the use method types of each computer;

a second updating device configured to perform update, if the determination result of the second determining device is "lower", and the determination result of the third determining device is "lower", thereby increasing a setting of a new method type pertaining to the input data processing device, the first analysis executing device, and the application executing device, among the use method types of each computer;

a third updating device configured to perform update, if the determination result of the second determining device is "not lower", and the determination result of the third determining device is "not lower", thereby increasing the setting of the existing method type among the use method types of each computer;

a fourth updating device configured to perform update, if the determination result of the second determining device is "not lower", and the determination result of the third determining device is "lower", thereby increasing the setting of the new method type among the use method types of each computer; and an execution instructing device configured to transmit, after the update of the setting, an execution instruction for each device pertaining to the use method type in the fifth storage device to each computer by the communicating device.

4. A non-transitory computer readable storage medium storing a program executed by a processor of a data analyzing apparatus comprising a first storage device, a second storage device, and a third storage device, the processor generating analysis target data by processing a format of input data having an objective variable and each variable as a candidate for an explanatory variable for the objective variable, generating a knowledge model indicating the objective variable based on each variable by analyzing the analysis target data, and obtaining a new objective variable by applying the knowledge model to each variable of new input data, the program comprising:

a first program code which allows the processor to execute a process of writing, in the first storage device, a priority order indicating an order of accuracy when the knowledge model is generated, a format variation indicating the processed format, an analytical algorithm name used in analysis, an analytical parameter used in the analysis, a knowledge model name identifying the knowledge model, a knowledge model accuracy indicating accuracy when the knowledge model is generated, and an application accuracy indicating accuracy when the knowledge model is applied, in association with each other;

a second program code which causes the processor to execute a process of writing, in the second storage device, a plurality of format variation candidates as candidates for the format variation;

a third program code which causes the processor to execute a format variation generating process of generating a format variation of a combination not stored in the first storage device based on each format variation candidate;

a fourth program code which causes the processor to execute a first designating process of designating the generated format variation;

a fifth program code which causes the processor to execute an input data processing process of executing the processing based on the designated format variation, thereby generating the analysis target data from the input data;

a sixth program code which causes the processor to execute a process of writing, in third storage device, an analytical algorithm name candidate as a candidate for the analytical algorithm name, and a range of analytical parameters as candidates for the analytical parameter, in association with each other;

a seventh program code which causes the processor to execute an analytical parameter generating process of generating a combination of an analytical algorithm name and an analytical parameter not stored in the first storage device, based on the analytical algorithm name candidate and the analytical parameter range;

an eighth program code which causes the processor to execute a first writing process of writing the generated format variation and the generated analytical algorithm name and analytical parameter in the first storage device;

a ninth program code which causes the processor to execute a first notifying process of notifying first analysis execution information containing the generated analysis target data, and the format variation, the analytical algorithm name, and the analytical parameter written by the first writing process;

a 10th program code which causes the processor to execute a first analysis executing process of executing the analysis based on the first analysis execution information;

an 11th program code which causes the processor to execute an analytical result evaluating process of evaluating a knowledge model as an execution result of the analysis, and calculating a knowledge model accuracy indicating accuracy of the knowledge model;

a 12th program code which causes the processor to execute a second writing process of writing the knowledge model accuracy and a knowledge model name of the evaluated knowledge model in the first storage device in association with the format variation, the analytical algorithm name, and the analytical parameter written by the first writing process;

a 13th program code which causes the processor to execute a priority order updating process of updating a value of a priority order in the first storage device based on the knowledge model accuracy written by the second writing process;

a 14th program code which causes the processor to execute a first reading process of reading out a knowledge model name associated with a highest priority order in the first storage device after the update, and notifying application execution information containing the knowledge model name;

a 15th program code which causes the processor to execute an application executing process of executing the application based on a knowledge model having the knowledge model name in the application execution information;

a 16th program code which causes the processor to execute an application result evaluating process of evaluating an objective variable as an execution result of the application, and calculating an application accuracy indicating accuracy of the knowledge model in the application;

a 17th program code which causes the processor to execute a third writing process of writing the calculated application accuracy in the first storage device in association with the knowledge model name of the knowledge model in the application;

an 18th program code which causes the processor to execute a first determining process of determining whether the application accuracy written by the third writing process is lower than a knowledge model accuracy associated with the application accuracy in the first storage device;

a 19th program code which causes the processor to execute a reactivating process of reactivating the format variation generating process and the analytical parameter generating process, if a result of the determination is "not lower", thereby reexecuting the format variation generating process, the first designating process, the input data processing process, the analytical parameter generating process, the first writing process, the first notifying process, the first analysis executing process, the analytical result evaluating process, the second writing process, and the priority order updating process;

a 20th program code which causes the processor to execute a second reading process of reading out, if the result of the determination is "lower", a format variation and a knowledge model name associated with a highest priority order in the first storage device;

a 21st program code which causes the processor to execute a second designating process of designating the format variation read out by the second reading process in the format variation generating process, thereby obtaining new analysis target data from the format variation generating process;

a 22nd program code which causes the processor to execute a second notifying process of notifying second analysis execution information containing the new analysis target data, and the knowledge model name read out by the second reading process; and a 23rd program code which causes the processor to execute a second analysis executing process of executing analysis based on the second analysis execution information, and transmitting a knowledge model as an execution result of the analysis to the analytical result evaluating process.

5. The computer-readable storage medium according to claim 4, wherein the data analyzing apparatus further comprises:

a communicating device configured to communicate with a plurality of computers configured to execute an input data processing process, a first analysis executing process, an application executing process, and a second analysis executing process respectively identical to the input data processing process, the first analysis executing process, the application executing process, and the second analysis executing process;

a fourth storage device configured to store a knowledge model accuracy lower limit indicating a lower limit of the knowledge model accuracy, and an application accuracy lower limit indicating a lower limit of the application accuracy; and a fifth storage device configured to store, in association with each other, a machine name for identifying each computer, a use status of each computer, a use method type of each computer, and a knowledge model name used by each computer, and the program further comprises:

a 24th program code which causes the processor to execute a third reading process of reading out, from the first storage device, a knowledge model accuracy associated with the application accuracy written by the third writing process;

a 25th program code which causes the processor to execute a second determining process of determining whether the application accuracy written by the third writing process is lower than the application accuracy lower limit;

a 26th program code which causes the processor to execute a third determining process of determining whether the knowledge model accuracy read out by the third reading process is lower than the knowledge model accuracy lower limit;

a 27th program code which causes the processor to execute a first updating process of performing update, if the determination result of the second determining process is "lower", and the determination result of the third determining process is "not lower", thereby increasing, as much as possible, a setting of an existing method type pertaining to the input data processing process, the second analysis executing process, and the application executing process, among the use method types of each computer;

a 28th program code which causes the processor to execute a second updating process of performing update, if the determination result of the second determining process is "lower", and the determination result of the third determining process is "lower", thereby increasing a setting of a new method type pertaining to the input data processing process, the first analysis executing process, and the application executing process, among the use method types of each computer;

a 29th program code which causes the processor to execute a third updating process of performing update, if the determination result of the second determining process is "not lower", and the determination result of the third determining process is "not lower", thereby increasing the setting of the existing method type among the use method types of each computer;

a 30th program code which causes the processor to execute a fourth updating process of performing update, if the determination result of the second determining process is "not lower", and the determination result of the third determining process is "lower", thereby increasing the setting of the new method type among the use method types of each computer; and a 31st program code which causes the processor to execute an execution instructing process of transmitting, after the update of the setting, an execution instruction for each device pertaining to the use method type in the fifth storage device to each computer by the communicating device.

* * * * *